(12) United States Patent
Taguchi

(10) Patent No.: US 11,182,064 B2
(45) Date of Patent: Nov. 23, 2021

(54) INFORMATION PROCESSING APPARATUS PERFORMING CONTROL ON DRAG OPERATION

(71) Applicant: FUJIFILM Business Innovation Corp., Tokyo (JP)

(72) Inventor: Ryouji Taguchi, Kanagawa (JP)

(73) Assignee: FUJIFILM Business Innovation Corp., Tokyo (JP)

(\*) Notice: Subject to any disclaimer, the term of this patent is extended or adjusted under 35 U.S.C. 154(b) by 0 days.

(21) Appl. No.: 16/862,551

(22) Filed: Apr. 29, 2020

(65) Prior Publication Data

US 2021/0141504 A1    May 13, 2021

(30) Foreign Application Priority Data

Nov. 12, 2019 (JP) .............................. JP2019-204395

(51) Int. Cl.
*G06F 3/0486* (2013.01)
*G06F 3/0488* (2013.01)

(52) U.S. Cl.
CPC .......... *G06F 3/0486* (2013.01); *G06F 3/0488* (2013.01)

(58) Field of Classification Search
CPC ....... G06F 3/0486; G06F 3/0488; G06F 3/048
See application file for complete search history.

(56) References Cited

U.S. PATENT DOCUMENTS

| 10,896,447 | B1\* | 1/2021 | Cohen | G06F 3/0488 |
|---|---|---|---|---|
| 2009/0313567 | A1\* | 12/2009 | Kwon | G06F 3/0482 |
| | | | | 715/769 |
| 2014/0096048 | A1\* | 4/2014 | Rottler | G06F 3/0486 |
| | | | | 715/769 |
| 2014/0267079 | A1\* | 9/2014 | Duplan | G06Q 20/102 |
| | | | | 345/173 |
| 2015/0268786 | A1\* | 9/2015 | Kitada | G06F 3/0486 |
| | | | | 345/173 |
| 2017/0336944 | A1\* | 11/2017 | Liu | G06F 3/04842 |
| 2018/0253207 | A1\* | 9/2018 | Wang | H04L 29/08 |
| 2019/0065021 | A1\* | 2/2019 | Digman | G06F 3/0482 |
| 2019/0228589 | A1\* | 7/2019 | Dascola | G06F 3/04815 |

FOREIGN PATENT DOCUMENTS

JP    4507821    7/2010

\* cited by examiner

*Primary Examiner* — Jeanette J Parker
(74) *Attorney, Agent, or Firm* — JCIPRNET

(57) ABSTRACT

An information processing apparatus includes: a detection unit that detects an operation by an instruction unit on a display screen; and a control unit that controls whether to perform processing by a specific operation, which is one of a drag start operation or a drag end operation by the instruction unit, according to a movement state of the instruction unit in a case where the specific operation is detected by the detection unit.

2 Claims, 8 Drawing Sheets

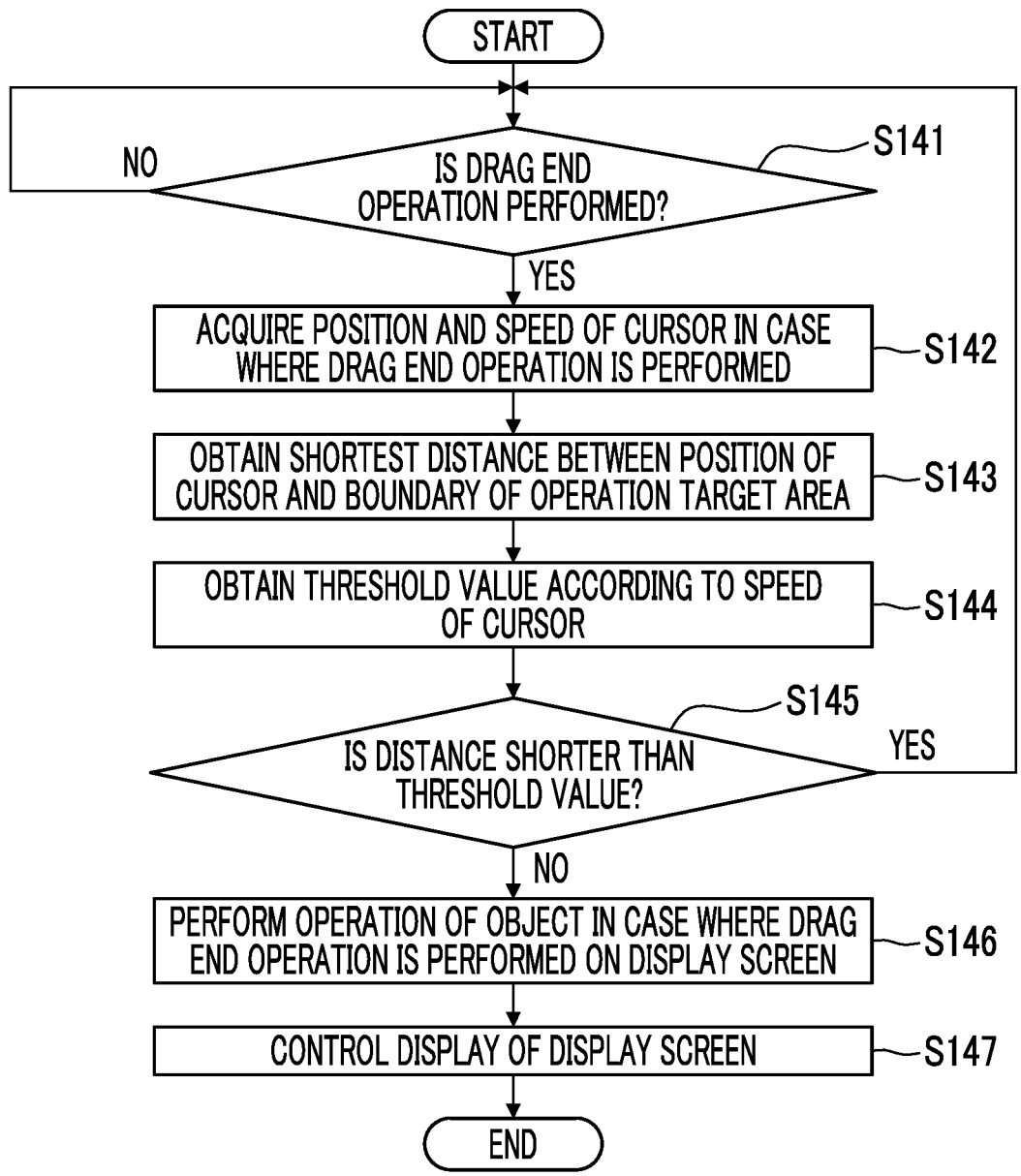

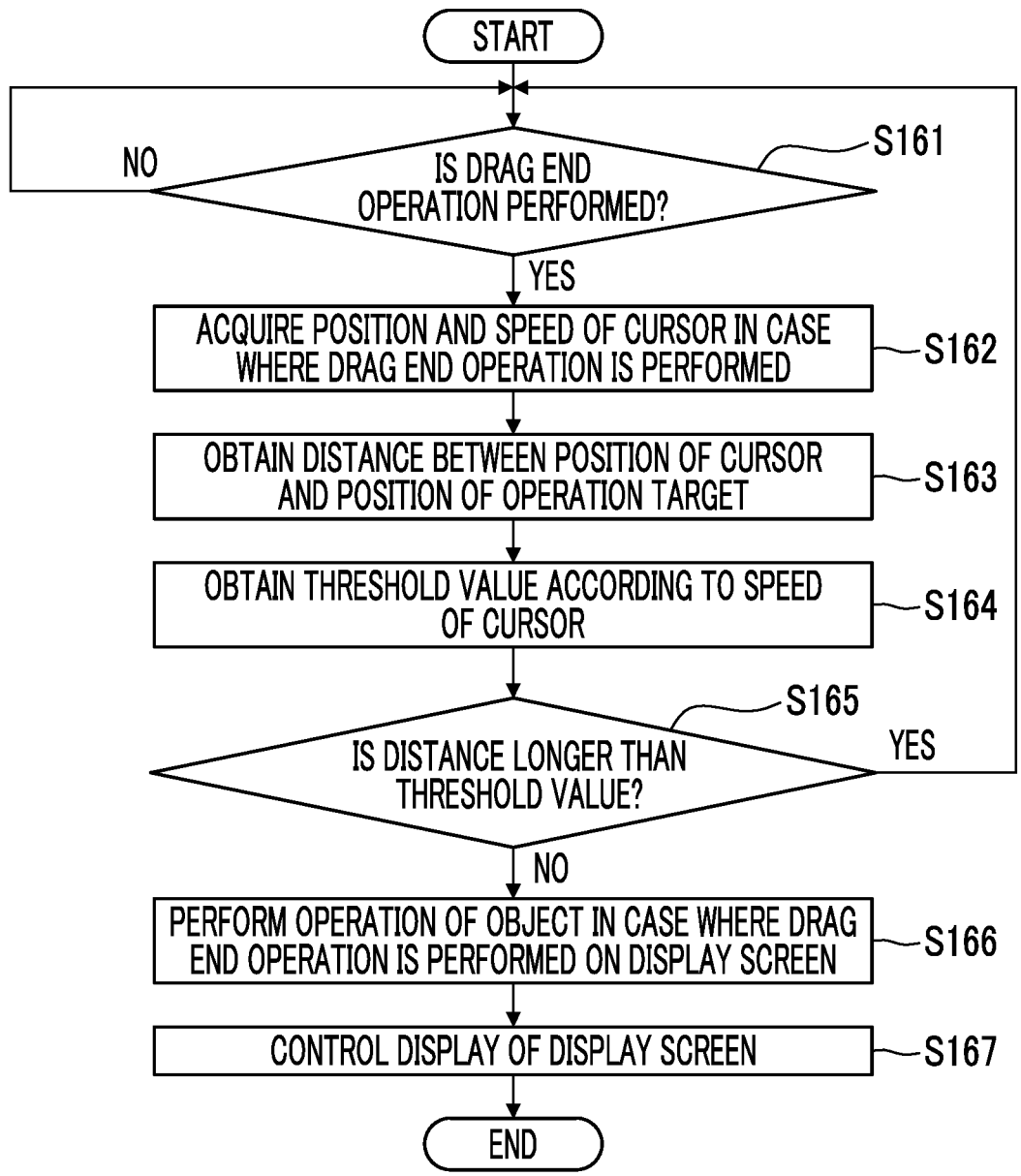

INFORMATION PROCESSING APPARATUS PERFORMING CONTROL ON DRAG OPERATION

CROSS-REFERENCE TO RELATED APPLICATIONS

This application is based on and claims priority under 35 USC 119 from Japanese Patent Application No. 2019-204395 filed Nov. 12, 2019.

BACKGROUND (i) Technical Field

The present invention relates to an information processing apparatus.

(ii) Related Art

A mouse operation support program is known (for example, refer to JP4507821B), the program determining propriety of processing in a case where dropping processing of an object is performed at a location specified by a cursor, and, in a case where it is determined that the dropping processing of an object is improper, performing recovery processing to return to a state before the dropping processing, after a mouse click event occurs and before or after the dropping processing, automatically or according to a request to cancel the dropping processing.

SUMMARY

In an area in which a drag start operation or a drag end operation is allowed, a drag start operation or a drag end operation may be erroneously performed. In such a case, a configuration of determining propriety of a target and an area of a drag start operation or a drag end operation and, in a case where it is determined that processing by the drag start operation or the drag end operation is improper by determination of propriety of the target and the area, performing a control such that the processing by the drag start operation or the drag end operation is not performed, is adopted. In this configuration, in a case where it is determined that processing by the drag start operation or the drag end operation is proper by determination of propriety of the target and the area of the drag start operation or the drag end operation, the processing by the drag start operation or the drag end operation is performed.

Further, it is considered that a drag start operation or a drag end operation is erroneously performed in a state where an area in which a drag start operation or a drag end operation is allowed is not defined. In such a case, a configuration of determining propriety of a target and an area of a drag start operation or a drag end operation and, in a case where it is determined that processing by the drag start operation or the drag end operation is improper by determination of propriety of the target and the area, performing a control such that the processing by the drag start operation or the drag end operation is not performed, cannot be adopted. As a result, the processing by the drag start operation or the drag end operation is performed.

Aspects of non-limiting embodiments of the present disclosure relate to an information processing apparatus that performs a control such that processing by a drag start operation or a drag end operation is not performed in a case where a drag start operation or a drag end operation is erroneously performed in an area in which a drag start operation or a drag end operation is allowed or in a case where a drag start operation or a drag end operation is erroneously performed in a state where an area in which a drag start operation or a drag end operation is allowed is not defined.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a detection unit that detects an operation by an instruction unit on a display screen; and a control unit that controls whether to perform processing by a specific operation, which is one of a drag start operation or a drag end operation by the instruction unit, according to a movement state of the instruction unit in a case where the specific operation is detected by the detection unit.

BRIEF DESCRIPTION OF THE DRAWINGS

Exemplary embodiment(s) of the present invention will be described in detail based on the following figures, wherein:

FIG. 6 is a flowchart illustrating the first operation example of the information processing apparatus according to the second exemplary embodiment of the present invention;

FIG. 7 is a flowchart illustrating a second operation example of the information processing apparatus according to the second exemplary embodiment of the present invention.

DETAILED DESCRIPTION

Hereinafter, exemplary embodiments of the present invention will be described in detail with reference to the accompanying drawings.

Hardware Configuration of Information Processing Apparatus

Figure 1:
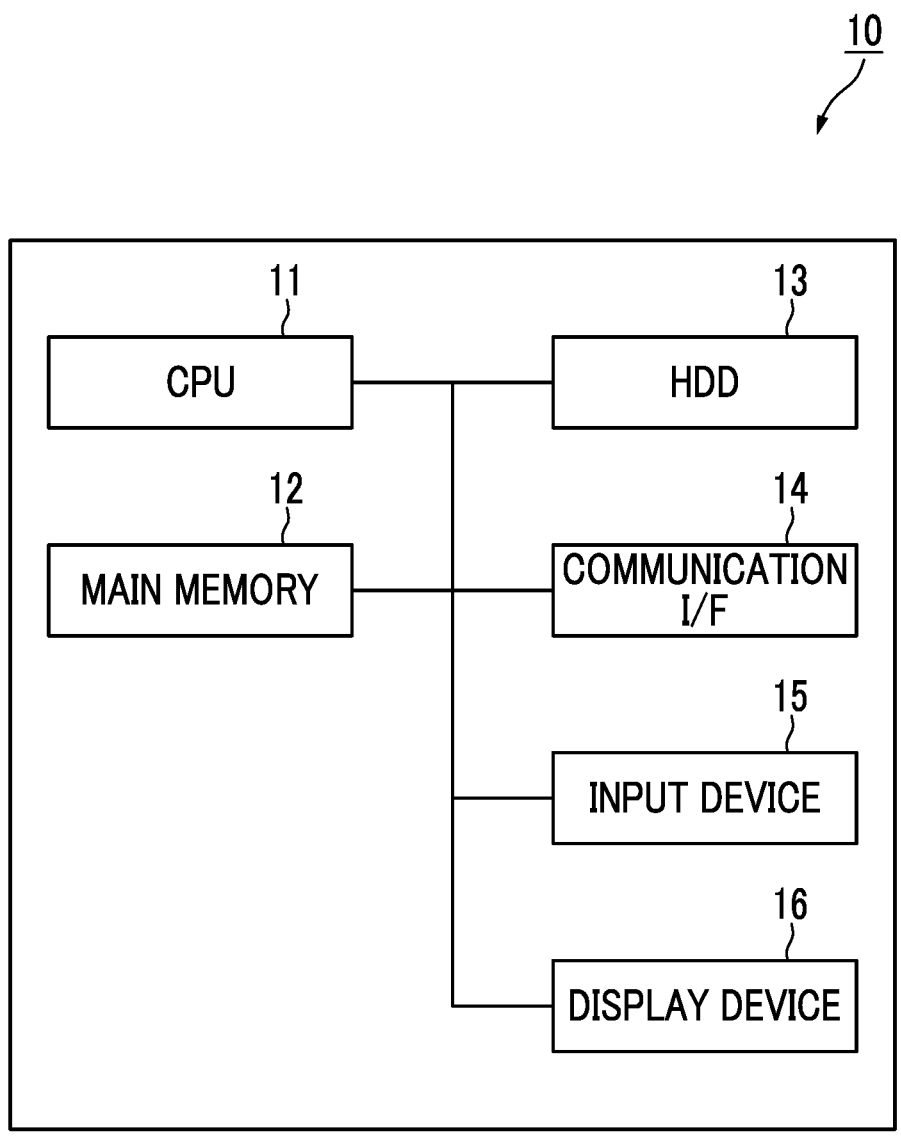
FIG. 1 is a diagram illustrating an example of a hardware configuration of an information processing apparatus according to an exemplary embodiment of the present invention.

FIG. 1 is a diagram illustrating an example of a hardware configuration of an information processing apparatus 10 according to this exemplary embodiment. As illustrated in FIG. 1, the information processing apparatus 10 includes a CPU 11 as a computation unit, a main memory 12 as a storage unit, and a hard disk drive (HDD) 13. Here, the CPU 11 executes various software such as an operating system (OS) and an application, and realizes each function to be described. In addition, the main memory 12 is a storage area that stores various software and data used for executing the software, and the HDD 13 is a storage area that stores input data to various software and output data from various software. Further, the information processing apparatus 10 includes a communication I/F 14 that performs communication with the outside, an input device 15 as a pointing device such as a mouse and a touch panel, and a display device 16 such as a display.

In a case where the input device 15 is a pointing device such as a mouse, the input device 15 inputs a signal instructing movement of a cursor or a signal indicating that a button operation of the pointing device is performed. For example, in a state where a signal indicating that a button is pressed is input, in a case where a signal instructing movement of a cursor is input, it means that a drag start operation is performed. In addition, in this state, in a case where a signal indicating that pressing of the button is released is input, it means that a drag end operation is performed. In this case, the cursor is an example of an instruction unit.

Further, in a case where the input device 15 is a pointing device such as a touch panel, the input device 15 inputs a signal indicating that a finger or a touch pen (hereinafter, simply referred to as a "finger or the like") is moved on the pointing device or that a finger or the like comes into contact with the pointing device. For example, in a state where a signal indicating that a finger or the like comes into contact with the pointing device is input, in a case where a signal indicating that a finger or a touch pen is moved on the pointing device is input, it means that a drag start operation is performed. In this state, in a case where a signal indicating that contact of the finger or the like is released is input, it means that a drag end operation is performed.

In this case, a finger or the like is an example of an instruction unit.

The display device 16 displays a display screen. In a case where the input device 15 is a pointing device such as a mouse, the display device 16 additionally displays a cursor. In a case where the input device 15 is a pointing device such as a touch panel, the display screen is included in the input device 15, as a part.

Hereinafter, it is assumed that the input device 15 is a pointing device such as a mouse and that a display screen and a cursor are displayed on the display device 16.

Functional Configuration of Information Processing Apparatus

Figure 2:
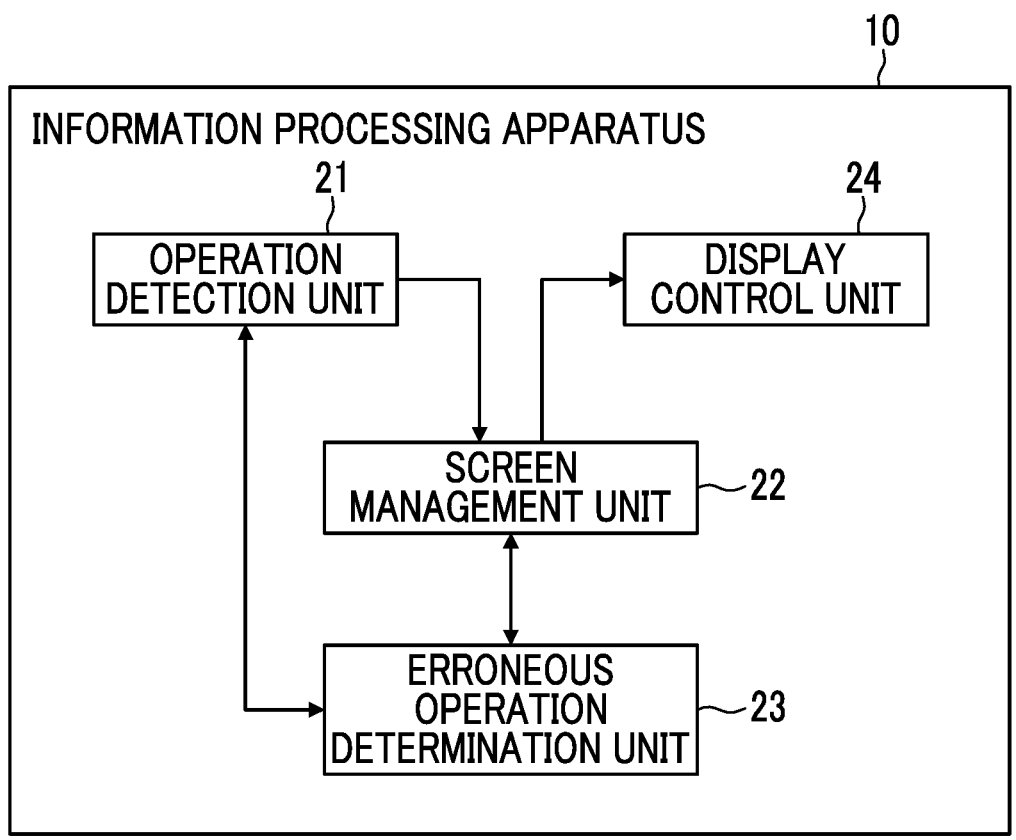
FIG. 2 is a block diagram illustrating an example of a functional configuration of the information processing apparatus according to the exemplary embodiment of the present invention.

FIG. 2 is a block diagram illustrating an example of a functional configuration of the information processing apparatus 10 according to this exemplary embodiment. As illustrated FIG. 2, the information processing apparatus 10 according to this exemplary embodiment includes an operation detection unit 21, a screen management unit 22, an erroneous operation determination unit 23, and a display control unit 24.

The operation detection unit 21 detects an operation by the input device 15 by receiving a signal input from the input device 15. Specifically, the operation detection unit 21 detects a drag start operation or a drag end operation. In addition, the operation detection unit 21 acquires a speed or an acceleration of a cursor, a position or a movement direction of a cursor in a case where a drag start operation or a drag end operation is detected, and the like. In this exemplary embodiment, as an example of a detection unit that detects an operation by the instruction unit on the display screen, the operation detection unit 21 is provided.

The screen management unit 22 manages a position and a size of an object displayed on the display screen. In a case of receiving information indicating that an operation is detected, the operation detection unit 21 determines a positional relationship between the position of the cursor and the position of the object on the display screen, or controls an operation of the object on the display screen based on the drag start operation or the drag end operation.

The erroneous operation determination unit 23 determines whether or not the drag start operation or the drag end operation detected by the operation detection unit 21 may be an erroneous operation. For example, the erroneous operation determination unit 23 determines whether or not the drag start operation or the drag end operation may be an erroneous operation, based on the speed or the acceleration of the cursor and the position of the cursor, which are acquired by the operation detection unit 21, and the determination result of the positional relationship between the position of the cursor and the position of the object by the screen management unit 22. In a case where it is determined that the drag start operation or the drag end operation may be an erroneous operation, the erroneous operation determination unit 23 cancels the operation. In a case where it is not determined that the drag start operation or the drag end operation may be an erroneous operation, the erroneous operation determination unit 23 instructs the screen management unit 22 to perform the operation of the object in a case where the drag start operation or the drag end operation is performed. In this exemplary embodiment, as an example of a control unit that controls whether to perform processing by the drag start operation or the drag end operation from the instruction unit, the erroneous operation determination unit 23 is provided.

The display control unit 24 converts information of the display screen managed by the screen management unit 22 into a signal which can be received by the display device 16, and outputs the signal to the display device 16.

First Exemplary Embodiment

Outline

In a first exemplary embodiment, the information processing apparatus 10 controls whether to perform processing by a specific operation, which is one of a drag start operation and a drag end operation by the instruction unit, according to a movement state of the instruction unit in a case where the specific operation is detected. Specifically, in a case where the movement state is a first movement state intended to perform the specific operation, the information processing apparatus 10 performs a control such that processing by the specific operation is performed, and in a case where the movement state is a second movement state not intended to perform the specific operation, the information processing apparatus 10 performs a control such that processing by the specific operation is not performed.

First Operation Example

In a first operation example, as the movement state, a movement state based on a speed of the cursor is exemplified. Specifically, a movement state where the cursor moves at a first speed is exemplified as the first movement state, and a movement state where the cursor moves at a second speed higher than the first speed is exemplified as the second movement state. In a case where a drag start operation or a drag end operation is performed, usually, the cursor slowly moves. Therefore, in the first operation example, in a case where a movement speed of the cursor at the time of receiving the drag start operation or the drag end operation is higher than a predetermined threshold value, it is determined that the drag start operation or the drag end operation may be an erroneous operation, and the drag start operation or the drag end operation is canceled.

Figure 3:
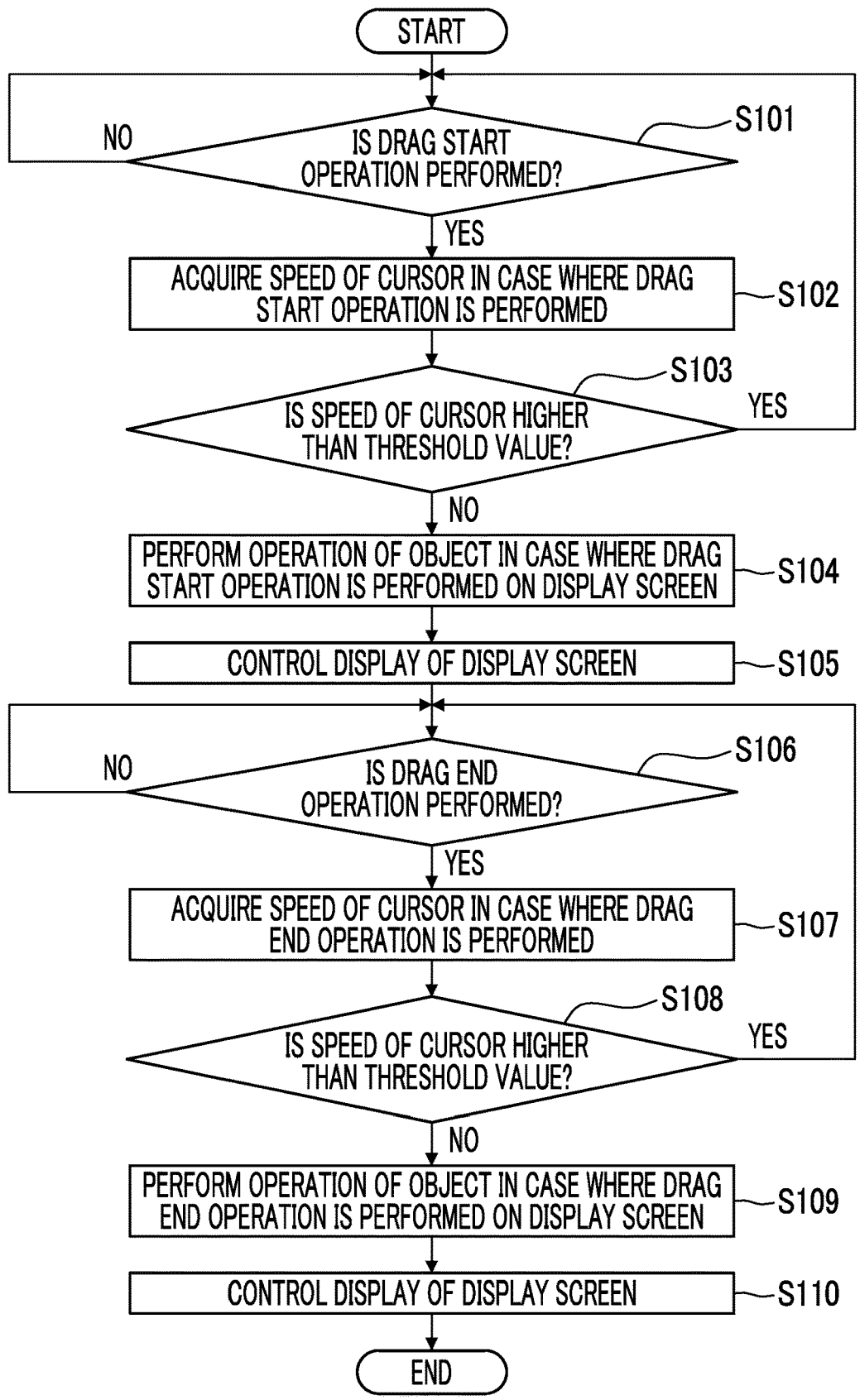
FIG. 3 is a flowchart illustrating a first operation example of the information processing apparatus according to a first exemplary embodiment of the present invention.

FIG. 3 is a flowchart illustrating the first operation example of the information processing apparatus 10 according to the first exemplary embodiment.

In the information processing apparatus 10, first, the operation detection unit 21 determines whether or not a drag start operation is performed by the input device 15 (step S101). In a case where it is not determined that a drag start operation is performed by the input device 15, the operation detection unit 21 repeats step S101.

In a case where it is determined that a drag start operation is performed by the input device 15, the operation detection unit 21 acquires a speed of the cursor in a case where the drag start operation is performed (step S102).

Thereby, the erroneous operation determination unit 23 determines whether or not the speed of the cursor acquired in step S102 is higher than a predetermined threshold value (step S103). In a case where it is determined that the speed of the cursor acquired in step S102 is higher than the threshold value, it is considered that the drag start operation detected in this time is an erroneous operation, and thus the process returns to step S101.

In a case where it is not determined that the speed of the cursor acquired in step S102 is higher than the threshold value, it is considered that the drag start operation detected in this time is not an erroneous operation, and thus the screen management unit 22 performs an operation of the object in a case where the drag start operation is performed on the display screen (step S104). Further, the display control unit 24 controls display of the display screen on the display device 16 (step S105). For example, in a case where the drag start operation is an operation to start movement of an icon, the display control unit 24 controls display on the display device 16 such that movement of the icon is started.

Next, the operation detection unit 21 determines whether or not a drag end operation is performed by the input device 15 (step S106). In a case where it is not determined that a drag end operation is performed by the input device 15, the operation detection unit 21 repeats step S106.

In a case where it is determined that a drag end operation is performed by the input device 15, the operation detection unit 21 acquires a speed of the cursor in a case where the drag end operation is performed (step S107).

Thereby, the erroneous operation determination unit 23 determines whether or not the speed of the cursor acquired in step S107 is higher than a predetermined threshold value (step S108). In a case where it is determined that the speed of the cursor acquired in step S107 is higher than the threshold value, it is considered that the drag end operation detected in this time is an erroneous operation, and thus the process returns to step S106.

In a case where it is not determined that the speed of the cursor acquired in step S107 is higher than the threshold value, it is considered that the drag end operation detected in this time is not an erroneous operation, and thus the screen management unit 22 performs an operation of the object in a case where the drag end operation is performed on the display screen (step S109). Further, the display control unit 24 controls display of the display screen on the display device 16 (step S110). For example, in a case where the drag end operation is an operation to end movement of an icon, the display control unit 24 controls display on the display device 16 such that the icon is dropped.

Second Operation Example

In a second operation example, as the movement state, a movement state based on an acceleration of the cursor is exemplified. Specifically, a movement state where the cursor moves at a first acceleration is exemplified as the first movement state, and a movement state where the cursor moves at a second acceleration higher than the first acceleration is exemplified as the second movement state. In a case where a drag start operation or a drag end operation is performed, usually, the cursor is not accelerated. Therefore, in the second operation example, in a case where the acceleration of the cursor at the time of receiving the drag start operation or the drag end operation is higher than a predetermined threshold value, it is determined that the drag start operation or the drag end operation may be an erroneous operation, and the drag start operation or the drag end operation is canceled.

Figure 4:
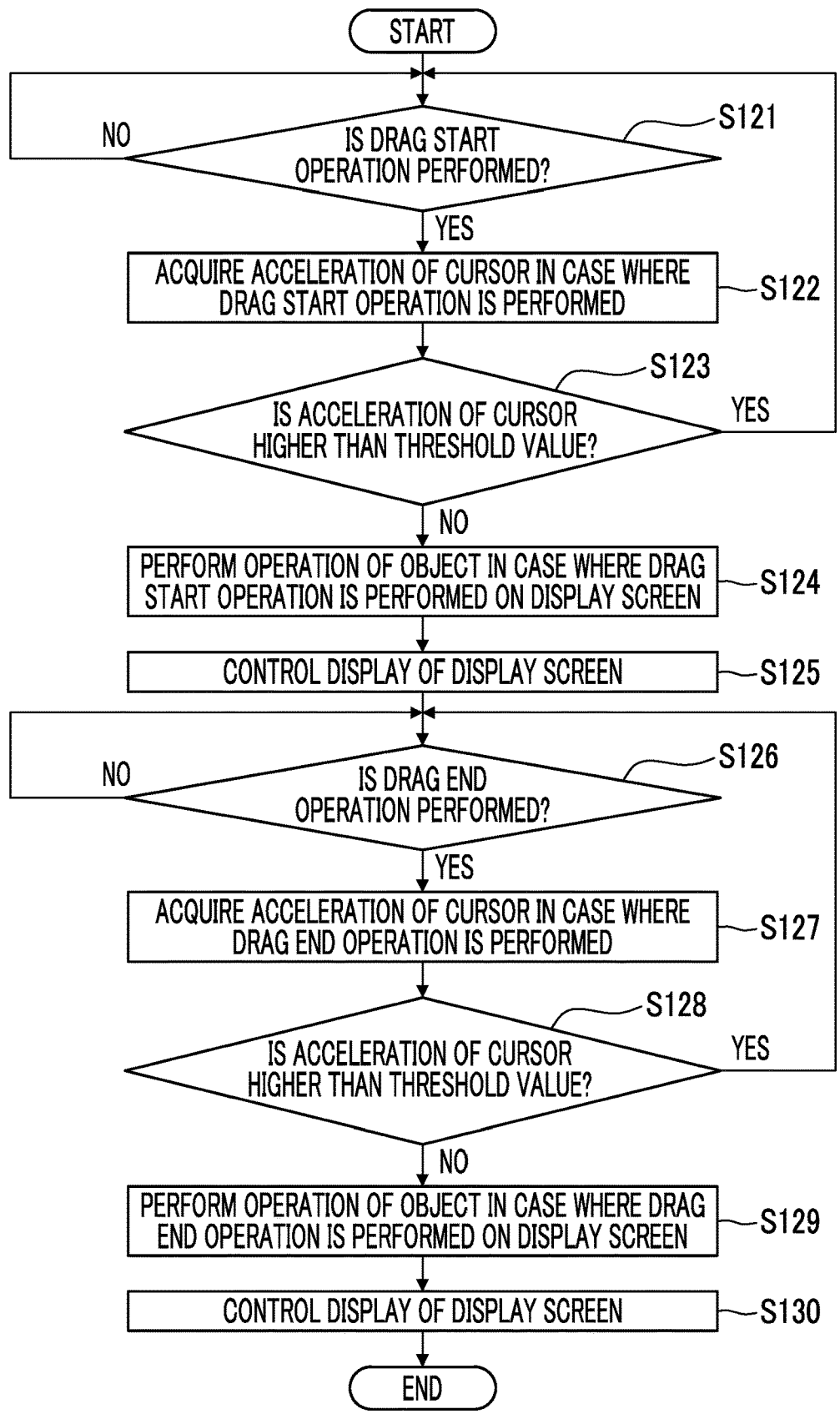
FIG. 4 is a flowchart illustrating a second operation example of the information processing apparatus according to the first exemplary embodiment of the present invention.

FIG. 4 is a flowchart illustrating the second operation example of the information processing apparatus 10 according to the first exemplary embodiment.

In the information processing apparatus 10, first, the operation detection unit 21 determines whether or not a drag start operation is performed by the input device 15 (step S121). In a case where it is not determined that a drag start operation is performed by the input device 15, the operation detection unit 21 repeats step S121.

In a case where it is determined that a drag start operation is performed by the input device 15, the operation detection unit 21 acquires an acceleration of the cursor in a case where the drag start operation is performed (step S122).

Thereby, the erroneous operation determination unit 23 determines whether or not the acceleration of the cursor acquired in step S122 is higher than a predetermined threshold value (step S123). In a case where it is determined that the acceleration of the cursor acquired in step S122 is higher than the threshold value, it is considered that the drag start operation detected in this time is an erroneous operation, and thus the process returns to step S121.

In a case where it is not determined that the acceleration of the cursor acquired in step S122 is higher than the threshold value, it is considered that the drag start operation detected in this time is not an erroneous operation, and thus the screen management unit 22 performs an operation of the object in a case where the drag start operation is performed on the display screen (step S124). Further, the display control unit 24 controls display of the display screen on the display device 16 (step S125). For example, in a case where the drag start operation is an operation to start movement of an icon, the display control unit 24 controls display on the display device 16 such that movement of the icon is started.

Next, the operation detection unit 21 determines whether or not a drag end operation is performed by the input device 15 (step S126). In a case where it is not determined that a drag end operation is performed by the input device 15, the operation detection unit 21 repeats step S126.

In a case where it is determined that a drag end operation is performed by the input device 15, the operation detection unit 21 acquires an acceleration of the cursor in a case where the drag end operation is performed (step S127).

Thereby, the erroneous operation determination unit 23 determines whether or not the acceleration of the cursor acquired in step S127 is higher than a predetermined threshold value (step S128). In a case where it is determined that the acceleration of the cursor acquired in step S127 is higher than the threshold value, it is considered that the drag end operation detected in this time is an erroneous operation, and thus the process returns to step S126.

In a case where it is not determined that the acceleration of the cursor acquired in step S127 is higher than the threshold value, it is considered that the drag end operation detected in this time is not an erroneous operation, and thus the screen management unit 22 performs an operation of the object in a case where the drag end operation is performed on the display screen (step S129). Further, the display control unit 24 controls display of the display screen on the display device (step S130). For example, in a case where the drag end operation is an operation to end movement of an icon, the display control unit 24 controls display on the display device 16 such that the icon is dropped.

Second Exemplary Embodiment

Outline

In a second exemplary embodiment, the information processing apparatus 10 controls whether to perform processing by a specific operation, which is one of a drag start operation and a drag end operation by the instruction unit, according to a positional relationship between an operation position, which is a position of the instruction unit in a case where the specific operation is detected, and a target-associated position, which is a position associated with a target on which the specific operation is allowed to be performed, and a speed of the instruction unit in a case where the specific operation by the instruction unit is detected. Specifically, in a case where a combination of the positional relationship and the speed of the instruction unit is a first combination intended to perform the specific operation, the information processing apparatus 10 performs a control such that processing by the specific operation is performed, and in a case where a combination of the positional relationship and the speed of the instruction unit is a second combination not intended to perform the specific operation, the information processing apparatus 10 performs a control such that processing by the specific operation is not performed.

First Operation Example

In a first operation example, as the target-associated position, a position of a boundary of an area for determining whether a specific operation is performed on a target (hereinafter, referred to as an "operation target area") is exemplified. In addition, as the first combination, a combination of a positional relationship, in which the operation position is within the operation target area and the operation position and the position of the boundary of the operation target area are away from each other by a first distance at the shortest, and a first speed of the instruction unit is exemplified, the first distance being longer than a distance according to the first speed of the instruction unit. Further, as the second combination, a combination of a positional relationship, in which the operation position is within the operation target area and the operation position and the position of the boundary of the operation target area are away from each other by a second distance at the shortest, and a second speed of the instruction unit is exemplified, the second distance being shorter than a distance according to the second speed of the instruction unit. In a case where a drag start operation or a drag end operation is performed, usually, the operation position is within the operation target area and is away from the boundary of the operation target area. Here, it is considered that the distance between the operation position and the boundary of the operation target area depends on the speed of the cursor in a case where a drag start operation or a drag end operation is performed. Therefore, in the first operation example, in a case where the position of the cursor at the time of receiving a drag start operation or a drag end operation is within the operation target area and the distance between the position of the cursor and the boundary of the operation target area is shorter than a threshold value according to the speed of the cursor, it is determined that the drag start operation or the drag end operation may be an erroneous operation, and the drag start operation or the drag end operation is canceled.

Hereinafter, a case where the first operation example is applied to a drag end operation will be described. On the other hand, the first operation example is also applied to a drag start operation.

Figure 5A:
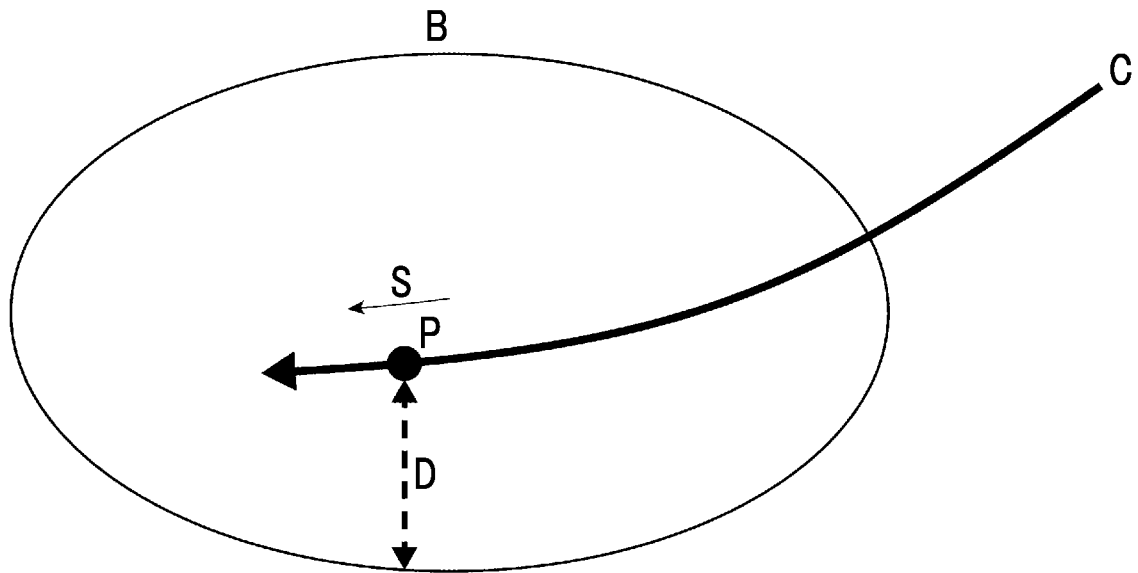
FIG. 5A is a diagram schematically illustrating contents of a first operation example of the information processing apparatus according to a second exemplary embodiment of the present invention.

FIG. 5A is a diagram schematically illustrating contents of the first operation example of the information processing apparatus 10 according to the second exemplary embodiment.

In FIG. 5A, the position of the cursor in a case where a drag end operation is performed on a trajectory C of the cursor is set as the operation position P. Further, a shortest distance between the operation position P and the boundary B is set as a distance D, and the speed of the cursor at the operation position P is set as S. In a case where the distance D is shorter than a threshold value according to the speed S of the cursor, it is determined that the drag end operation may be an erroneous operation.

Figure 5B:
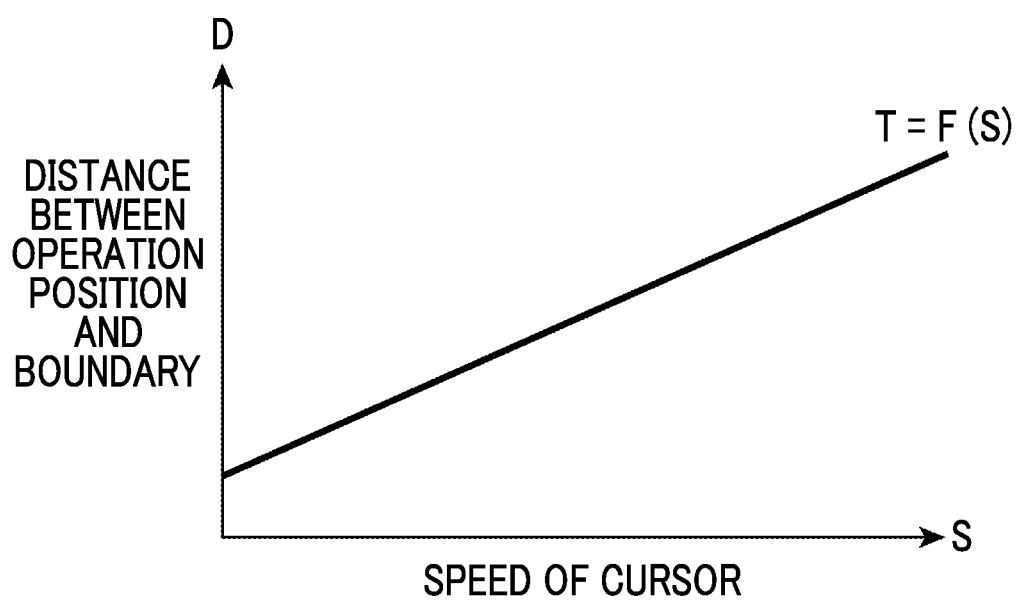
FIG. 5B is a graph showing an example of a function for determining a threshold value according to a speed of a cursor in the first operation example of the information processing apparatus according to the second exemplary embodiment of the present invention.

FIG. 5B is a graph showing an example of a function F for determining a threshold value T according to the speed S of the cursor.

The graph shows that the threshold value T is determined from the speed S of the cursor by T=F(S). In a case where a combination of the distance D and the speed S of the cursor is in a region above the graph, it is determined that the drag end operation at the operation position P is a correct operation, and in a case where a combination of the distance D and the speed S of the cursor is in a region below the graph, it is determined that the drag end operation at the operation position P is an erroneous operation. Here, the function F is a linear function. The function F is not limited to a linear function and may be a non-linear function. For example, in a case where the operation position P is close to the boundary B but the speed S of the cursor is high, the drag end operation at the operation position P may be an erroneous operation. In this case, the function F may be, for example, an increase function. By using such a function, even in a case where the drag end operation is performed immediately after the cursor passes through the boundary B with the high speed S, it can be determined that the drag end operation is an erroneous operation.

FIG. 6 is a flowchart illustrating the first operation example of the information processing apparatus 10 according to the second exemplary embodiment.

In the information processing apparatus 10, first, the operation detection unit 21 determines whether or not a drag end operation is performed by the input device 15 (step S141). In a case where it is not determined that a drag end operation is performed by the input device 15, the operation detection unit 21 repeats step S141.

In a case where it is determined that a drag end operation is performed by the input device 15, the operation detection unit 21 acquires a position and a speed of the cursor in a case where the drag end operation is performed (step S142).

Next, the screen management unit 22 obtains a shortest distance from a distance between the position of the cursor acquired in step S142 and the boundary of the operation target area managed by the screen management unit 22 (step S143).

Next, the erroneous operation determination unit 23 obtains a threshold value according to the speed of the cursor acquired in step S142 (step S144).

Thereby, the erroneous operation determination unit 23 determines whether or not the distance obtained in step S143 is shorter than the threshold value obtained in step S144 (step S145). In a case where it is determined that the distance obtained in step S143 is shorter than the threshold value obtained in step S144, it is considered that the drag end operation detected in this time is an erroneous operation, and thus the process returns to step S141.

In a case where it is not determined that the distance obtained in step S143 is shorter than the threshold value obtained in step S144, it is considered that the drag end operation detected in this time is not an erroneous operation, and thus the screen management unit 22 performs an operation of the object in a case where the drag end operation is performed on the display screen (step S146). Further, the display control unit 24 controls display of the display screen on the display device 16 (step S147). For example, in a case where the drag end operation is an operation to end movement of an icon, the display control unit 24 controls display on the display device 16 such that the icon is dropped.

Second Operation Example

In a second operation example, as the target-associated position, a position of a target on which a specific operation is allowed to be performed (hereinafter, referred to as "operation target") is exemplified. In a case where the operation target is a point, the position of the operation target may be a position of the point. In a case where the operation target is a shape having an area, the position of the operation target may be a position of a point on the shape determined by a predetermined rule. For example, in a case where the operation target is an icon, a position of the center of the icon may be set as the position of the operation target. In addition, as the first combination, a combination of a positional relationship between the operation position and the position of the operation target, which are away from each other by a first distance, and a first speed of the instruction unit is exemplified, the first distance being shorter than a distance according to the first speed of the instruction unit. Further, as the second combination, a combination of a positional relationship between the operation position and the position of the operation target, which are away from each other by a second distance, and a second speed of the instruction unit is exemplified, the second distance being longer than a distance according to the second speed of the instruction unit. In a case where a drag start operation or a drag end operation is performed, usually, the operation position is a position close to the operation target. Here, it is considered that the distance between the operation position and the operation target depends on the speed of the cursor in a case where a drag start operation or a drag end operation is performed. Therefore, in the second operation example, in a case where the position of the cursor at the time of receiving a drag start operation or a drag end operation is a position at which the distance between the operation position and the position of the operation target is longer than a threshold value according to the speed of the cursor, it is determined that the drag start operation or the drag end operation may be an erroneous operation, and the drag start operation or the drag end operation is canceled.

Hereinafter, a case where the second operation example is applied to a drag end operation will be described. On the other hand, the second operation example is also applied to a drag start operation.

FIG. 7 is a flowchart illustrating the second operation example of the information processing apparatus 10 according to the second exemplary embodiment.

In the information processing apparatus 10, first, the operation detection unit 21 determines whether or not a drag end operation is performed by the input device 15 (step S161). In a case where it is not determined that a drag end operation is performed by the input device 15, the operation detection unit 21 repeats step S161.

In a case where it is determined that a drag end operation is performed by the input device 15, the operation detection unit 21 acquires a position and a speed of the cursor in a case where the drag end operation is performed (step S162).

Next, the screen management unit 22 obtains a distance between the position of the cursor acquired in step S162 and the position of the operation target managed by the screen management unit 22 (step S163).

Next, the erroneous operation determination unit 23 obtains a threshold value according to the speed of the cursor acquired in step S162 (step S164).

Thereby, the erroneous operation determination unit 23 determines whether or not the distance obtained in step S163 is longer than the threshold value obtained in step S164 (step S165). In a case where it is determined that the distance obtained in step S163 is longer than the threshold value obtained in step S164, it is considered that the drag end operation detected in this time is an erroneous operation, and thus the process returns to step S161.

In a case where it is not determined that the distance obtained in step S163 is longer than the threshold value obtained in step S164, it is considered that the drag end operation detected in this time is not an erroneous operation, and thus the screen management unit 22 performs an operation of the object in a case where the drag end operation is performed on the display screen (step S166). Further, the display control unit 24 controls display of the display screen on the display device 16 (step S167). For example, in a case where the drag end operation is an operation to end movement of an icon, the display control unit 24 controls display on the display device 16 such that the icon is dropped.

Third Exemplary Embodiment

Outline

In a third exemplary embodiment, the information processing apparatus 10 controls whether to perform processing by a drag end operation, according to a time length from a time when a drag end operation by the instruction unit is detected to a time when a drag start operation by the instruction unit is detected. Specifically, in a case where the time length is a first time length intended to perform a drag end operation, the information processing apparatus 10 performs a control such that processing by the drag end operation is performed, and in a case where the time length is a second time length not intended to perform a drag end operation, the information processing apparatus 10 performs a control such that processing by the drag end operation is not performed.

Operation Example

In this operation example, as the first time length, a time length longer than a predetermined time length is exemplified, and as the second time length, a time length shorter than the predetermined time length is exemplified. During a drag operation, a drag end operation and a drag start operation may be continuously performed in a short time due to trembling of a finger or the like. For this reason, in this operation example, in a case where a drag end operation is performed and then a drag start operation is detected again within a predetermined time, it is determined that the drag end operation may be an erroneous operation, and a drag state is continued.

Figure 8:
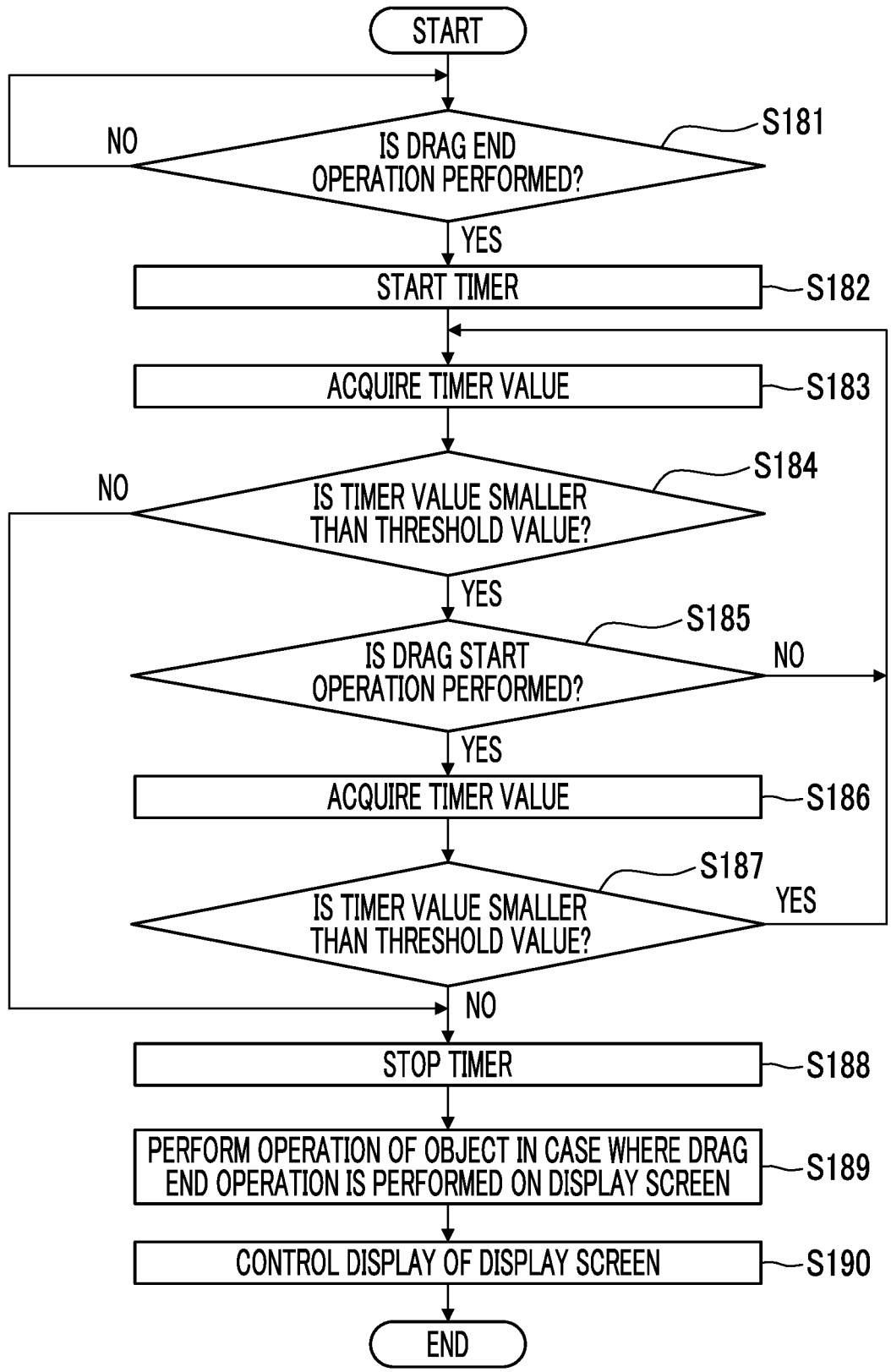
FIG. 8 is a flowchart illustrating an operation example of the information processing apparatus according to a third exemplary embodiment of the present invention.

FIG. 8 is a flowchart illustrating the operation example of the information processing apparatus 10 according to the third exemplary embodiment.

In the information processing apparatus 10, first, the operation detection unit 21 determines whether or not a drag end operation is performed by the input device 15 (step S181). In a case where it is not determined that a drag end operation is performed by the input device 15, the operation detection unit 21 repeats step S181.

In a case where it is determined that a drag end operation is performed by the input device 15, the erroneous operation determination unit 23 starts a timer that measures a time from a time when the drag end operation is performed (step S182). Next, the erroneous operation determination unit 23 acquires a timer value of the timer started in step S182 (step S183), and determines whether or not the timer value acquired in step S183 is smaller than a predetermined threshold value (step S184).

In a case where it is determined that the timer value acquired in step S183 is smaller than the threshold value, since it is not yet determined whether the drag end operation detected in this time is an erroneous operation, the operation detection unit 21 determines whether or not a drag start operation is performed by the input device 15 (step S185). In a case where it is not determined that a drag start operation is performed by the input device 15, in the operation detection unit 21, the process returns to step S183.

In a case where it is determined that a drag start operation is performed by the input device 15, the erroneous operation determination unit 23 acquires a timer value of the timer started in step S182 (step S186), and determines whether or not the timer value acquired in step S186 is smaller than a predetermined threshold value (step S187). In a case where it is determined that the timer value acquired in step S186 is smaller than the threshold value, it is considered that the drag end operation detected in this time is an erroneous operation, and thus the process returns to step S183.

In a case where it is not determined that the timer value acquired in step S186 is smaller than the threshold value, it is considered that the drag end operation detected in this time is not an erroneous operation. Thus, the erroneous operation determination unit 23 stops the timer (step S188), and the screen management unit 22 performs an operation of the object in a case where the drag end operation is performed on the display screen (step S189). Further, the display control unit 24 controls display of the display screen on the display device (step S190). For example, in a case where the drag end operation is an operation to end movement of an icon, the display control unit 24 controls display on the display device 16 such that the icon is dropped.

Further, even in a case where it is not determined that the timer value acquired in step S183 is smaller than the threshold value, it is considered that the drag end operation detected in this time is not an erroneous operation. Thus, the erroneous operation determination unit 23 stops the timer (step S188), and the screen management unit 22 performs an operation of the object in a case where the drag end operation is performed on the display screen (step S189). Further, the display control unit 24 controls display of the display screen on the display device 16 (step S190). For example, in a case where the drag end operation is an operation to end movement of an icon, the display control unit 24 controls display on the display device 16 such that the icon is dropped.

Modification Example

The first, second, and third exemplary embodiments may be freely combined with each other. In each of the first, second, and third exemplary embodiments, the following configuration may be added.

That is, in a case where the erroneous operation determination unit 23 determines that the drag start operation or the drag end operation may be an erroneous operation, a screen for confirming whether to perform an operation (a copy, a movement, or the like) of the object by the drag start operation or the drag end operation may be displayed. Further, in a case where an instruction not to perform an operation of the object is input from the screen, the drag start operation or the drag end operation may be canceled.

In addition, in a case where it is determined that the drag start operation or the drag end operation may be an erroneous operation by comparing a determination value with a threshold value, the erroneous operation determination unit 23 may request a user to confirm whether or not the operation is actually an erroneous operation, and record several past confirmation results and determination values. Here, as the determination value, in the first exemplary embodiment, the speed or the acceleration of the cursor is used, and in the second exemplary embodiment, the position of the cursor, and the boundary of the operation target area or the position of the operation target are used. In the third exemplary embodiment, as the determination value, a time from a time when the drag end operation is performed to a time when the drag start operation is performed is used. In the recorded several past confirmation results, in a case where there is a confirmation result indicating that it is determined that the drag operation may be an erroneous operation by the comparison between the determination value and the threshold value but indicating that the drag operation is not actually an erroneous operation, the erroneous operation determination unit 23 may adjust the threshold value based on the confirmation result.

In addition, the erroneous operation determination unit 23 may store a threshold value for determining whether or not the drag operation may be an erroneous operation for each type of the input device 15, specify a type of the input device 15 used for performing the drag operation, and determine whether or not the drag operation may be an erroneous operation using the threshold value stored for the type of the input device 15. Further, the erroneous operation determination unit 23 may store past determination values for each type of the input device 15.

Program

The processing performed by the image processing apparatus 10 according to this exemplary embodiment is prepared, for example, as a program such as application software.

That is, a first program for realizing this exemplary embodiment is regarded as a program for realizing a function of causing a computer to detect an operation by the instruction unit on the display screen and control whether to perform processing by a specific operation, which is one of a drag start operation and a drag end operation by the instruction unit, according to a movement state of the instruction unit in a case where the specific operation is detected.

In addition, a second program for realizing this exemplary embodiment is regarded as a program for realizing a function of causing a computer to detect an operation by the instruction unit on the display screen and control whether to perform processing by a specific operation, which is one of a drag start operation and a drag end operation by the instruction unit, according to a positional relationship between an operation position, which is a position of the instruction unit in a case where the specific operation is detected, and a target-associated position, which is a position associated with a target on which the specific operation is allowed to be performed.

Further, a third program for realizing this exemplary embodiment is regarded as a program for realizing a function of causing a computer to detect an operation by the instruction unit on the display screen and control whether to perform processing by a drag end operation, according to a time length from a time when the drag end operation by the instruction unit is detected to a time when a drag start operation by the instruction unit is detected.

The program for realizing this exemplary embodiment may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a memory and
a processor configured to:
execute software stored in the memory;
detect an operation by an instruction unit on a display screen; and
control whether to perform processing by a specific operation, which is one of a drag start operation and a drag end operation by the instruction unit, according to a positional relationship between an operation position, which is a position of the instruction unit in a case where the specific operation is detected by the detection unit, and a target-associated position, which is a position associated with a target on which the specific operation is allowed to be performed, and a speed of the instruction unit in a case where the specific operation by the instruction unit is detected by the detection unit,
wherein, the processor is configured so that, in a case where a combination of the positional relationship and the speed of the instruction unit is a first combination intended to perform the specific operation, the processor performs a control such that processing by the specific operation is performed, and, in a case where a combination of the positional relationship and the speed of the instruction unit is a second combination not intended to perform the specific operation, the processor performs a control such that processing by the specific operation is not performed,
wherein the target-associated position is a position of the target on which the specific operation is allowed to be performed,
wherein the first combination is a combination of a positional relationship between the operation position and the position of the target, which are away from each other by a first distance, and a first speed of the instruction unit, the first distance being shorter than a distance determined as a function of the first speed of the instruction unit, and
wherein the second combination is a combination of a positional relationship between the operation position and the position of the target, which are away from each other by a second distance, and a second speed of the instruction unit, the second distance being longer than a distance determined as a function of the second speed of the instruction unit.

2. An information processing apparatus, comprising:
a memory and
a processor configured to:
execute software stored in the memory;
detect an operation by an instruction unit on a display screen; and
control whether to perform processing by a specific operation, which is one of a drag start operation and a drag end operation by the instruction unit, according to a positional relationship between an operation position, which is a position of the instruction unit in a case where the specific operation is detected by the detection unit, and a target-associated position, which is a position associated with a target on which the specific operation is allowed to be performed, and a speed of the instruction unit in a case where the specific operation by the instruction unit is detected by the detection unit,
wherein, the processor is configured so that, in a case where a combination of the positional relationship and the speed of the instruction unit is a first combination intended to perform the specific operation, the processor performs a control such that processing by the specific operation is performed, and, in a case where a combination of the positional relationship and the speed of the instruction unit is a second combination not intended to perform the specific operation, the processor performs a control such that processing by the specific operation is not performed,
wherein the target-associated position is a position of a boundary of an area for determining whether or not the specific operation is performed on the target,
wherein the first combination is a combination of a positional relationship, in which the operation position is within the area and the operation position and the position of the boundary of the area are away from each other by a first distance at the shortest, and a first speed of the instruction unit, the first distance being longer than a distance determined as a function of the first speed of the instruction unit, and wherein the second combination is a combination of a positional relationship, in which the operation position is within the area and the operation position and the position of the boundary of the area are away from each other by a second distance at the shortest, and a second speed of the instruction unit, the second distance being shorter than a distance determined as a function of the second speed of the instruction unit.

* * * * *